United States Patent [19]

Herrmann

[11] Patent Number: 5,280,352
[45] Date of Patent: Jan. 18, 1994

[54] CIRCUIT ARRANGEMENT FOR TIME BASE TRANSFORMATION OF A DIGITAL PICTURE SIGNAL

[75] Inventor: Matthias Herrmann, Braunschweig, Fed. Rep. of Germany

[73] Assignee: U.S. Philips Corporation, New York, N.Y.

[21] Appl. No.: 817,186

[22] Filed: Jan. 6, 1992

[30] Foreign Application Priority Data

Feb. 1, 1991 [DE] Fed. Rep. of Germany ....... 4102993

[51] Int. Cl.$^5$ .............................................. H04N 5/04
[52] U.S. Cl. .................................... 358/160; 358/149; 358/339; 331/20
[58] Field of Search ................ 358/148, 149, 150, 155, 358/158, 339, 140, 11, 160; 331/9, 10, 15, 18, 20; H04N 5/04, 5/08

[56] References Cited

U.S. PATENT DOCUMENTS

| | | | |
|---|---|---|---|
| 4,525,685 | 6/1985 | Hesselberth et al. | 331/10 |
| 4,578,705 | 3/1986 | Elmis et al. | 358/150 |
| 4,730,216 | 3/1988 | Casey et al. | 358/140 |
| 4,827,225 | 3/1989 | Lee | 331/10 |
| 5,117,290 | 5/1992 | Heerkens | 358/158 |
| 5,121,207 | 6/1992 | Herrmann | 358/160 |
| 5,159,292 | 10/1992 | Canfield | 331/20 |
| 5,181,115 | 1/1993 | Flamm et al. | 358/158 |

OTHER PUBLICATIONS

Fernseh-Und Kino-Technick 40, Mar. 1986, pp. 105, 106, 110.

Primary Examiner—Mark R. Powell
Assistant Examiner—Jeffrey S. Murrell
Attorney, Agent, or Firm—Edward W. Goodman

[57] ABSTRACT

A digital circuit arrangement for transforming an input digital picture signal onto a reference horizontal synchronizing signal raster derived from the system clock, which input digital picture signal is present at a system clock rate not locked with the input digital picture signal, which includes a correction memory (1), an interpolator/decimator (2), and a control member for the purpose of a transformation which is as insensitive to interference as possible. The control member receives a control deviation signal (d) obtained with the aid of a discriminator (4) by comparing a horizontal synchronizing signal in the input digital picture signal with the reference horizontal synchronizing signal, and the control member applies a first correcting variable (i) to the correction memory (1), the first correcting variable (i) indicating transformation of the input digital picture signal by integral multiples of the system clock period to be performed by the correction memory (1), and the control member also applies a second correcting variable ($a_s$) to the interpolator/decimator (2), the second correcting variable ($a_s$) indicating the transformation by fractions of the system clock period to be performed by the interpolator/decimator (2).

13 Claims, 2 Drawing Sheets

CIRCUIT ARRANGEMENT FOR TIME BASE TRANSFORMATION OF A DIGITAL PICTURE SIGNAL

BACKGROUND OF THE INVENTION

1. Field of the Invention

The invention relates to a digital circuit arrangement for transforming an input digital picture signal onto a reference horizontal synchronizing signal raster derived from the system clock, the input digital picture signal being present at a system clock rate not locked with said input digital picture signal, said arrangement comprising a correction memory and an interpolator/decimator.

2. Description of the Related Art

If a digital picture signal is scanned at a system clock rate which is not locked with the picture signal or if this picture signal is already present at such a clock rate, this means that the digital picture signal, on the one hand, and the scanning raster, on the other hand, can be freely displaced with respect to each other. This particularly holds for phase shifts possibly occurring in the picture signal, for example, when the signal is displayed by a video recorder. It is often desirable to have the digital picture signal in an orthogonal raster, enabling it to be more easily processed, for example, in picture memories. To this end, the digital picture signal may be transformed onto a reference horizontal synchronizing signal raster which is derived from the system clock and is independent of the picture signal. Circuit arrangements which are capable of doing this are known from the prepublication "Fernseh und Kinotechnik" Vol. 40, no. 3/1986, pp. 105 to 111 and from prior German Patent Application 39 35 453 (PHD 89186), corresponding to U.S. patent application Ser. No. 07/599,336, filed Oct. 17, 1990, now U.S. Pat. No. 5,121,207. In these two circuit arrangements, a correction memory and an interpolator/decimator are used for transforming the picture signal. In the arrangement according to the prior patent application they are controlled by means of a forward control.

Such a control particularly does not lead to a desired transformation of the digital picture signal when there is interference in this signal. Examples of interference are particularly, amplitude errors, noise superpositions or the flattening of the signal edges produced by limitations of the transmission bandwidth. Such interferences principally lead to a distortion of the correction value provided by the control and hence to a false transformation of the picture signal.

SUMMARY OF THE INVENTION

It is, inter alia, an object of the invention to provide a circuit arrangement of the type described in the opening paragraph which is possibly insensitive to interferences superimposed on the picture signal.

According to one aspect of the invention, this object is solved in that a control member is provided which is coupled to receive a deviation signal obtained with the aid of a discriminator by comparing a horizontal signal in the input digital picture signal with the reference horizontal synchronizing signal, for applying a first correcting variable to the correction memory, said first correcting variable indicating the transformation of the digital picture signal by integral multiples of the system clock period to be performed by said correction memory, and for applying a second correcting variable to the interpolator/decimator, said second correcting variable indicating the transformation by fractions of the system clock period to be performed by said interpolator/decimator.

To gain the deviation signal applied to the control member, the horizontal synchronizing signal contained in the picture signal or its raster is compared with a reference horizontal synchronizing signal or its raster. This reference horizontal synchronizing signal raster is derived in a fixed predetermined way from the system clock and is not dependent on the picture signal or on its possible phase fluctuations. By comparing this reference horizontal synchronizing signal with the horizontal synchronizing signal contained in the picture signal with the aid of a discriminator, a deviation signal is obtained which is applied to the control member, and from which the control member generates two correction variables.

The digital picture signal is transformed by means of the correction memory and the interpolator/decimator. The correction memory can only perform transformations in which the picture signal is transformed by integral multiples of the system clock periods. Consequently, a first correcting variable of the two correcting variables gained by the control member is applied to this correction memory, this first correcting variable indicating that transformation which amounts to integral multiples of the system clock periods. For the further, fine transformation, the control member generates the second correcting variable which is applied to the interpolator/decimator. This second correcting variable indicates that transformation to be performed which represents a transformation of the picture signal only by fractions of the system clock periods. The two correcting variables combined result in the desired transformation of the digital picture signal onto the reference horizontal synchronizing signal raster with the aid of the correction memory and the interpolator/decimator, i.e. a transformation after which the horizontal synchronizing signal contained in the picture signal and the reference horizontal synchronizing signal raster derived from the system clock coincide. The transformed picture signal is thus present in a known orthogonal raster which is defined by the reference horizontal synchronizing signal.

By controlling the transformation to be performed by the correction memory or the interpolator/decimator, a distinctly improved insensitivity to interference is achieved so that a substantially flawless time-base transformation of the picture signal is effected despite a picture signal which may be beset with interference.

In one embodiment of the invention, the control member comprises a proportional-integral element preceding an integral element. In such a control circuit of the second order, which has two degrees of freedom, the control member can be given an optimum layout.

In a further embodiment of the invention, the control member generates a control clock signal whose rising or falling edges mark new and valid values of the correcting variables. This control clock signal indicates those instants when the correcting variables can be taken over by subsequent circuit elements, particularly the correction memory. This control clock signal may be particularly derived from the system clock.

In a further embodiment of the invention, the control member supplies a correction signal comprising the two correcting variables. The two correcting variables described hereinbefore may be comprised in a correcting signal which is only partly evaluated by subsequent circuit parts. Thus, for example, the correction memory can only evaluate those parts of the correcting signal which indicate a transformation by integral multiples of the system clock periods, whereas the interpolator/decimator only evaluates those parts of the correcting signal which relate to a transformation to be performed by fractions of the system clock periods. Since a digital correcting signal is concerned, the evaluation of only individual elements of the correcting signal can easily be performed by evaluating only given bits of the correcting signal.

In a further embodiment of the invention, the correction memory has a first and a second memory site in which the data of the digital picture signal are entered in parallel, while with each new value of the first correcting variable the read address of alternately the first and the second memory site is changed in dependence upon the correcting variable in addition to its continuous change at each clock, and a switching signal is generated indicating, after a predeterminable time interval after changing the read address in dependence upon the correcting variable, that memory site whose read address was last changed in dependence upon the correcting variable.

Generally it holds for circuit arrangements which perform a time-base transformation of the type described with the aid of a correction memory and an interpolator/decimator that a transformation by integral multiples of the system clock periods performed in the correction memory results in interferences in the subsequent interpolator/decimator or in its output signal. This is caused by the fact that not all consecutive scanning values of the picture signal are available any longer in the interpolator/decimator in the case of a transformation performed by the correction memory, so that the interpolator/decimator can no longer perform the interpolation correctly. To avoid this problem, the correction memory is advantageously adapted in such a way that it supplies two output signals both of which represent the digital picture signal but of which only one is subjected to every last transformation of the picture signal in the correction memory, i.e. the other signal is not subjected to a transformation just being performed.

For this purpose the correction memory is designed in such a way that it has two memory sites. The digital picture signal is entered in parallel into the two memory sites in the same way. During the read process, in which the read addresses of the two memory sites are continuously changed in accordance with the read process, the read address of alternately the first and the second memory site is additionally changed in dependence upon the correcting variable at each new value of the first correcting variable. Furthermore, a switching signal is generated in the correction memory, indicating which one of the read addresses was last changed in dependence upon the correcting variable. After a predeterminable time interval after the performed transformation or increase of the read addresses, in accordance with the first correcting variable this switching signal is generated. This switching signal is particularly generated for subsequent circuit parts in which it must be known which of the two output signals of the two memory sites was last transformed and when this output signal was transformed.

This switching signal can be particularly utilized for a correct interpolation in the subsequent interpolator/decimator. Therefore, in a further embodiment of the invention, two register chains each having a plurality of n consecutively arranged registers are arranged in the interpolator/decimator, while the output signal of the first memory site of the correction memory is applied to one of the register chains and the output signal of the second memory site is applied to the other register chain, the interpolator/decimator comprising n multipliers, n coefficient memories and n switches, and one register of each of the two register chains being associated with each switch, while in dependence upon the switching signal each switch switches the output data of one of the two associated registers to the multiplier associated with the two registers, said output data being multiplied in said multiplier by a filter coefficient which is read from the associated coefficient memory in dependence upon the second correcting variable.

The two output signals of the two memory sites of the correction memory are thus read into two separate register chains of the interpolator/decimator. By means of switches it is now possible to switch between these two register chains so that their output signals can be alternatively switched to subsequently arranged multipliers. This switching operation is performed in dependence upon the switching signal generated by the correction memory. Also in the case of a transformation by an integral multiple of the system clock period performed by the correction memory it is then ensured that the interpolator/decimator always receives a continuous sequence of consecutive scanning values of the digital picture signal.

If each of the two register chains of the interpolator/decimator has a plurality of n registers, the predeterminable time interval, after which the switching signal indicates that memory site of the correction memory whose read address was last changed in dependence upon the correcting variable, is advantageously n+2 periods of the system clock in a further embodiment of the invention.

These and other aspects and embodiments of the invention will be described in greater detail with reference to the accompanying drawings

DESCRIPTION OF THE PREFERRED EMBODIMENT

Figure 1:
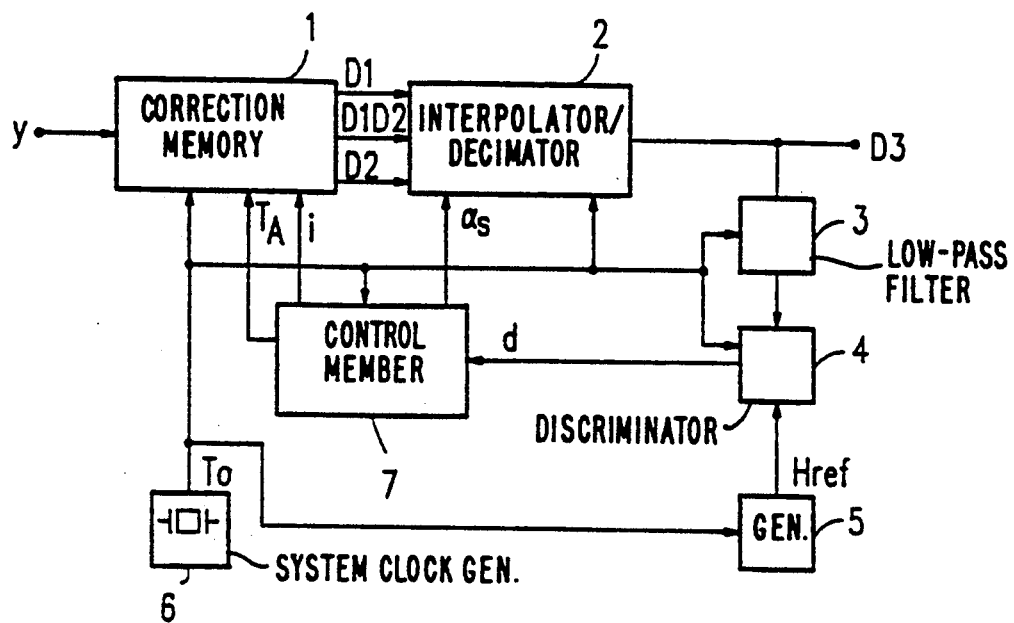
FIG. 1 is a block diagram of an embodiment of a digital circuit arrangement for time base transformation.

FIG. 1 shows a block diagram of a digital circuit arrangement, for transforming an input digital picture signal onto a reference horizontal synchronizing signal raster derived from the system clock, this input digital picture signal being present at a system clock rate not locked with said input digital picture signal. The input digital picture signal, denoted by Y in FIG. 1, is applied to the input of a correction memory 1. The correction memory 1 supplies two digital output signals denoted by D1 and D2 in FIG. 1. These signals are the picture signal. After each transformation to be performed, only one of the two signals D1 and D2 is transformed. The other picture signal thus remains unchanged. This transformation is performed alternately for the output signals D1 and D2. These two picture signals D1 and D2, as well as a switching signal D1D2, which indicates the picture signal last transformed, are applied to an interpolator/decimator 2. The interpolator/decimator 2 supplies at its output a digital picture signal D3 which represents the transformed digital picture signal which is now present in the reference horizontal synchronizing signal raster derived from the system clock.

To realize this transformation, the signal D3 at the output of the interpolator/decimator 2 is applied to a low-pass filter 3 whose output signal is applied to a discriminator 4. Furthermore, an output signal from a generator 5 generating the reference horizontal synchronizing signal raster is applied to the discriminator 4. To this end the generator 5 receives a system clock $T_o$ from a system clock generator 6. The generator 5 generates from this system clock the reference horizontal synchronizing signal raster in a fixed, predetermined manner. In the discriminator 4 the horizontal synchronizing signal contained in the digital picture signal D3 or its raster is compared with the reference horizontal synchronizing signal or its raster generated by the generator 5. From this comparison, a deviation signal is generated in the discriminator 4, this signal being denoted by d in FIG. 1 and is applied to a control member 7. The control member 7, which also receives the system clock $T_o$ generated by the system clock generator 6, generates two correcting variables from the deviation signal d, these variables being denoted by i and $\alpha_s$ in the Figure. The first correcting variable i indicates that transformation which should be performed by integral multiples of the system clock periods in the picture signal. To this end this first correcting variable i is applied to the correction memory 1 in which a transformation in accordance with the value of this correcting variable i is performed. The second correcting variable $\alpha_s$ supplied by the control member 7 indicates that transformation which is to be performed by fractions of the system clock periods. This correcting variable $\alpha_s$ is applied to the interpolator/decimator 2 in which the required fine transformation which is less than one period of the system clock is performed in accordance with this correcting variable. Both correcting variables i and $\alpha_s$ are time-discretely generated in the control member 7. A clock signal $T_A$, which is also generated in the control member 7, indicates when new correcting variable i and $\alpha_s$ which can be taken over by the correction memory 1 and/or the interpolator/decimator 2 are generated.

In the circuit arrangement shown in FIG. 1, the two correcting variables i and $\alpha_s$ and hence the transformation of the digital picture signal performed by the correction memory and the interpolator/decimator are gained in dependence upon the structure and dimensioning of the control member 7 which, dependent on the application of the circuit arrangement, can be given such a layout that interferences in the digital picture signal Y and hence in the output signal D3 of the circuit arrangement have a minimum influence on the transformation process.

Figure 2:
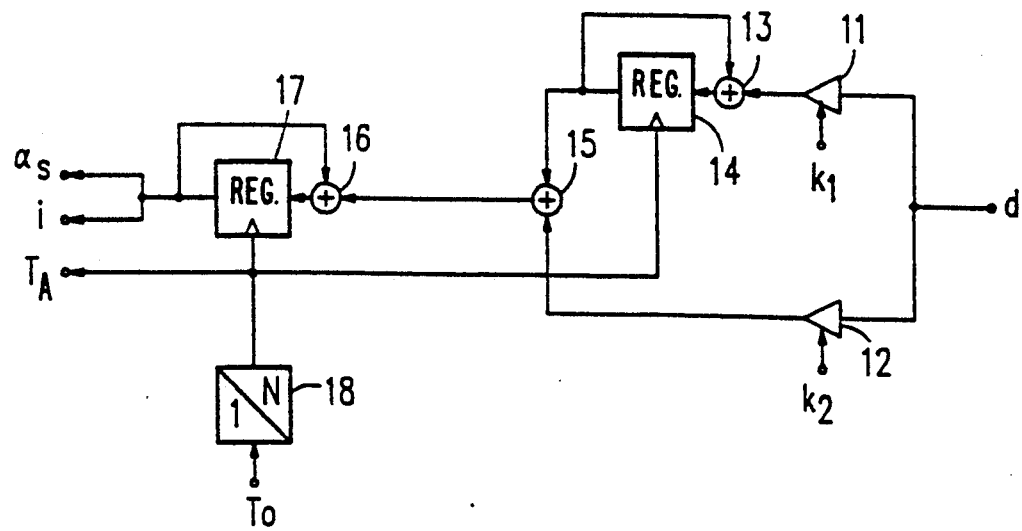
FIG. 2 shows an embodiment of a control member for the arrangement of FIG. 1.

FIG. 2 shows a control member which can be used advantageously as a control member 7 in the circuit arrangement of FIG. 1.

The control member shown in FIG. 2 comprises a proportional-integral element preceding a further integral element. This construction results in a control circuit of the second order which has two degrees of freedom and can thus be given an optimum layout as far as its control behavior is concerned.

The deviation signal d applied to the input of the control member shown in FIG. 2 is applied in the control member to the inputs of two multipliers 11 and 12. In the multiplier 11, the deviation signal is multiplied by a factor $k_1$ and in the multiplier 12 the deviation signal is multiplied by the factor $k_2$. The choice of $k_1$ and $k_2$ provides the possibility of adjusting the gain. The output signal of the multiplier 11 is applied to an adder 13 whose output signal is applied to a register 14. The output signal of the register 14 is fed back to a second input of the adder 13. Similarly as the output signal of the multiplier 12, the output signal of the register 14 is applied to an input of a further adder 15 whose output signal is applied to an adder 16. The output of the adder 16 is connected to an input of a further register 17 whose output signal is applied to a second input of the adder 16.

The control member shown in FIG. 2 further has a divider 18 whose input receives the system clock signal $T_o$ and in which this signal is divided by a factor of N. This output signal of the divider 18 divided to a lower value is used for clocking the registers 14 and 17.

The parallel arrangement at the input end of the multiplier 12 and the series arrangement of the multiplier 11 with the register 14 constituting an integrator together with the adder 13 represents a proportional-integral element. This proportional-integral element precedes a further integral element which is constituted by the register 17 and the feedback performed by means of the adder 16.

At the output the register 17 supplies a correcting signal which comprises the first correcting variable i and the second correcting variable $\alpha_s$. These two correcting variables i and $\alpha_s$ are the correcting variable which are also denoted by i and $\alpha_s$ in FIG. 1 and are applied to the correction memory 1 and the interpolator/decimator 2, respectively, of FIG. 1.

The registers 14 and 17 in the control member shown in FIG. 2 are clocked by the clock signal $T_A$ which is supplied by the divider 18. Thus, in the rhythm of this clock signal $T_A$, new correcting variables i and $\alpha_s$ are always available for subsequent parts of the circuit arrangement. This clock signal $T_A$ represents an output signal of the control member of FIG. 2 which signals to subsequent parts of the circuit arrangement when valid new values of the two correcting variables i and $\alpha_s$ are available.

Figure 3:
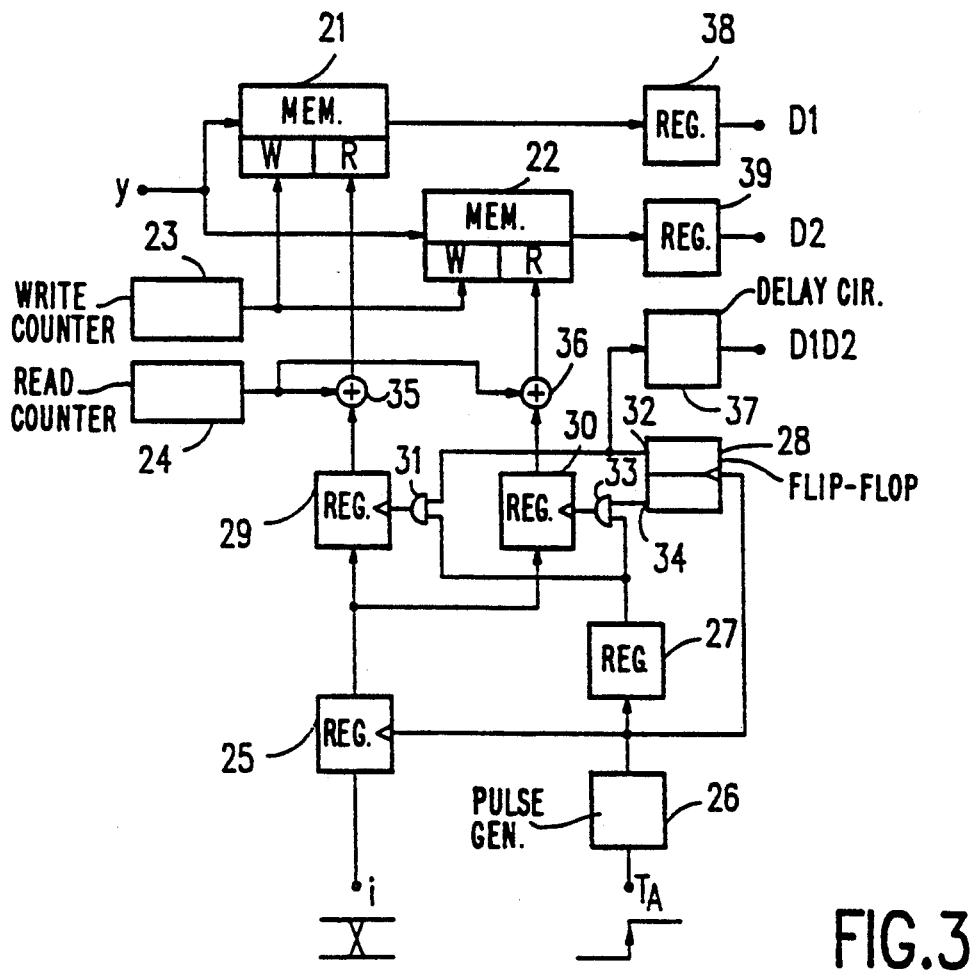
FIG. 3 shows an embodiment of a correction memory for the arrangement of FIG. 1.

FIG. 3 shows a correction memory in the form of a block diagram, that can be used, for example, as a correction memory 1 for the circuit arrangement of FIG. 1.

The digital picture signal Y which has not yet been transformed is applied to the input of the correction memory shown in FIG. 3. In the correction memory this picture signal reaches two memory sites 21 and 22 in which it is entered in parallel, i.e. in the same manner into the two memory sites. The read addresses required for this purpose are generated by means of a write counter 23.

For reading the data from the two memory sites 21 and 22, a read counter 24 is provided whose output address changes continuously. However, if the correction memory is to perform a transformation of the digital picture signal Y, this continuously changing address of the counter 24 should additionally be changed. The following circuit elements are provided for this purpose.

The correcting variable i applied to the correction memory and indicating the transformation by integral multiples of the digital picture signal to be performed by the correction memory, is applied to a register 25 in the correction memory of FIG. 3. This register 25 is clocked by means of a clock signal generated by a pulse generator 26, this clock signal being derived by this generator from the clock signal $T_A$ applied thereto and originating from the control member of the overall circuit arrangement. The pulse generator 26 generates a pulse in a defined manner at each positive edge of the signal $T_A$. This clock signal is further applied to the input of a register 27 which is clocked with the system clock $T_o$ in a manner not further shown in FIG. 3. Furthermore, the output signal of the pulse generator 26 is applied to the clock input of a flip-flop 28. The output signal of the register 25 reaches inputs of two registers 29 and 30. A first AND gate 31 is provided, one input of which is connected to the output of the register 27 and the other input of which is connected to a first output 32 of the flip-flop 28. The output signal of the first AND gate 31 is connected to the clock input of the register 29.

There is a further, second AND gate 33, one input of which receives the output signal of the register 27 and the second input of which is connected to the second output 34 of the flip-flop 28. The output signal of the second AND gate 33 is connected to the clock input of the register 30.

An output of the register 29 is connected to an adder 35 in which this signal is added to the output signal of the read counter 24. The output signal of the adder 35 is used for address control for the read process of the memory site 21.

The output signal of the register 30 is also added in an adder 36 to the output signal of the read counter 24. The output signal of the counter 36 indicates the read address of the second memory site 22.

The output signal which is present at the first output 32 of the flip-flop 28 reaches a delay circuit 37 which is clocked with the system clock signal $T_o$ and which supplies the switching signal D1D2 after a predetermined number of m clocks of the system clock signal.

The picture signal read from the first memory site 21 is applied to a register 38 which is clocked with the system clock $T_o$ and whose output supplies the signal D1. In a corresponding manner, the output signal of the second memory site 22 is applied to a register 39 whose output supplies the picture signal D2.

As described above, the read address of the memory site 21 and 22 is indicated by the read counter 24 whose output values or addresses change continuously. If the correcting variable i indicates that a time base transformation is to be performed in the correction memory, the value of this correcting variable is applied to the register 25. With the clock $T_A$ the pulse generator 26 generates a corresponding pulse which causes this correcting variable to be taken over in the register 25. The correcting variable is subsequently taken over by either the register 29 or the register 30. To this end the clock signal supplied by the register 27 is combined with the two output signals of the flip-flop 28 via the two AND gates 31 and 33. The flip-flop 28 is switched at each clock $T_A$ or at the pulse subsequently generated by the pulse generator 26. A high and a low signal thus alternately appear at the outputs 32 and 34, respectively, of the flip-flop. This causes the output signal of the register 27 to reach either the register 29 via the AND gate 31 or the register 30 via the AND gate 33. The two registers 29 and 30 are thus clocked alternately. This causes new correcting variables entered into the register 25 to be alternately entered into the register 29 and the register 30. As a result of the combination of the output signals of the registers 29 and 30 with the output signal of the read counter 24 by means of the adders 35 and 36, the output addresses of the two memory sites 21 and 22 are alternately changed in value in dependence upon the correcting variable i, which is read from the registers 29 and 30, in addition to the value predetermined by the read counter 24. For example, if a first value in the correcting variable i has been entered into the register 29 via the register 25, the output address of the first memory site 21 is changed in addition to the address value predetermined by the read counter 24. Consequently, the output signal D1 appears with a value which is transformed by the value of this correcting variable $i_1$. The output signal D2 is, however, not subjected to this transformation because the read address for the memory site 22 has only changed in dependence upon the address supplied by the read counter 24. This is caused by the fact that the correcting variable $i_1$ is not taken over in the register 30 because of the position of the flip-flop 28 and is thus not added to the read address in the adder 36. In this exemplary case, a value $i_1$ of the correcting variable i changes the signal D1 only, whereas the signal D2 is not transformed. For a subsequent value $i_2$ of the correcting variable i read at the subsequent clock $T_A$ the flip-flop 28 is switched at the next pulse of the pulse generator 26 so that its output 32 now has a low level and its output 34 has a high level. Thus no clock signal reaches the register 29 but instead the register 30 is clocked and the correcting variable $i_2$ is read from the register 25 into the register 30. As a result of the addition in the adder 36 with the address supplied by the read counter 24, the read address of the second memory site is changed in dependence upon the value $i_2$ of the correcting variable i. Thus, the signal D2 has now been transformed in accordance with the correcting variable $i_2$. Simultaneously, the signal D1 remains unchanged because the register 29 has not supplied any changed output value.

This process is continued, i.e. alternately the read addresses of the two memory sites 21 and 22 are changed in accordance with new values of the correcting variable i. Conversely, this means that one of the two output signals D1 and D2 remains uninfluenced by a transformation which has just been performed.

The switching signal D1D2 indicates which of the two output signals D1 or D2 has been transformed. This switching signal is generated in a delayed manner by the delay circuit 37.

Figure 4:
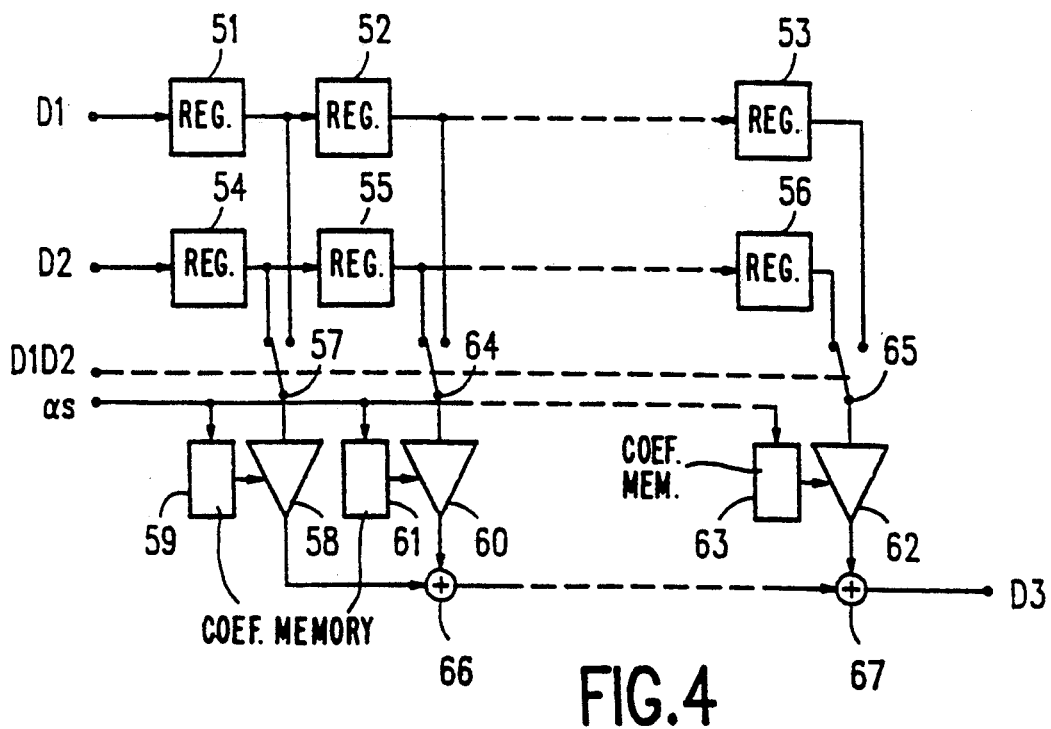
FIG. 4 shows an embodiment of an interpolator/decimator for the arrangement of FIG. 1.

This correction memory shown in FIG. 3 may be particularly used to advantage in connection with an interpolator/decimator shown in FIG. 4. Both devices combined can of course be used advantageously in the circuit arrangement of FIG. 1.

The two picture signals D1 and D2 supplied by the correction memory, as well as the switching signal D1D2 and the second correcting variable $a_s$ are applied to this interpolator/decimator shown in FIG. 4.

The interpolator/decimator shown in FIG. 4 has a first register chain of which only three registers 51, 52 and 53 are shown in FIG. 4 for the sake of simplicity.

Such a register chain may of course comprise more registers. However, it is important that the second register chain has the same number of registers. In FIG. 4 these are the registers 54, 55 and 56. The digital picture signal D1 is read into the first register chain comprising the registers 51 to 53. Picture signal D2 is read into the second register chain comprising the registers 54 to 56. A switch 57 which is followed by a multiplier 58 is associated with the register 51 of the first register chain and the register 54 of the second register chain. The output signal of either the register 51 or of the register 54 may be applied to the input of the multiplier 58 by means of the switch 57. This switching is performed in dependence upon the switching signal D1D2 which is applied to the switch 57 for this purpose. In the multiplier 58 the signal supplied by the switch 57 is multiplied by a filter coefficient which is read from a coefficient memory 59. The filter coefficients read from the coefficient memory 59 are selected in dependence upon the second correcting variable $a_s$ applied to the coefficient memory 59.

In the same way the two registers 52 and 55 are associated with a multiplier 60, a coefficient memory 61 and a switch 64. The registers 53 and 56 are associated with a multiplier 62, a coefficient memory 63 and a switch 65. The description with reference to multiplier 58, coefficient memory 59 and switch 57 also holds true for the mode of operation of the multipliers 60 and 62, the coefficient memories 61 and 63 and the switches 64 and 65.

The output signals of the multipliers 58, 60 and 62 are added to the output signal D3 by means of adders 66 and 67.

The two register chains of the interpolator/decimator shown in FIG. 4 are provided to ensure that a continuous sequence of consecutive scanning values is available in the interpolator/decimator at any time, thus also after a time base transformation performed in a preceding correction memory. For example, if a transformation by two pixels, i.e. by two system clock periods has been performed in a preceding correction memory, two scanning values will be missing in the registers of the chain if a conventionally constructed interpolator/decimator with only one register chain were used. A correct interpolation could then no longer be carried out.

For this reason the interpolator/decimator shown in FIG. 4 has two register chains in which the digital picture signals D1 and D2 are entered in parallel or are passed through these registers.

Either the first register chain with the registers 51 to 53 or the second register chain with the registers 54 to 56 is connected to the subsequent multipliers by means of the switches 57, 64 and 65 which are controlled by the switching signal D1D2. This switching process is performed in such a way that, after a time-base transformation performed in a preceding correction memory, there is a change-over to the transformed picture signal with such a delay that a continuous sequence of consecutive scanning data is again present without any intervals in this picture signal. Thus, if, for example, the picture signal D1 applied to the first register chain were time-base transformed in a preceding correction memory, the switches 57, 64 and 65 in the interpolator/decimator would still be connected to the second register chain in response to the corresponding switching signal D1D2 at the instant of transformation. Only with a time delay does the switching signal D1D2 indicate a change-over to the first register chain so that the switches 57, 64 and 65 are switched accordingly. The first register chain is now connected to the subsequently arranged multipliers. At the instant of switching, the switches 57, 64 and 65 consecutive scanning values have again been read without any interval into the registers 51 to 53 of the first register chain already after the raster conversion performed in the correction memory so that an interpolation/decimation without any interference can be performed again in the interpolator/decimator.

The switches 57, 64 and 65 now remain connected to the first register chain until the switching signal D1D2 indicates a change-over to the second register chain. This is, however, only the case after a time-base transformation has been performed in a preceding correction memory and the values subsequently read into the second register chain D2 again represent a continuous sequence of scanning values, i.e. with such a time delay that the "jump" caused as a result of the time-base transformation performed by the preceding correction memory is overwritten again in the second register chain.

This process of switching alternately between the two register chains is continued in this manner, in which a change-over to the other register chain does not take place until the picture signal values read into this register chain again represent a continuous sequence of consecutive scanning values of the digital picture signal after a transformation performed in a preceding correction memory.

In this way it is always ensured for the output signal of the interpolator/decimator shown in FIG. 4 that the interpolation/decimation is always carried out exclusively in a sequence of consecutive scanning values so that interferences which might result from a time-base transformation performed by a preceding correction memory are eliminated.

I claim:

1. A digital circuit arrangement for transforming an input digital picture signal onto a reference horizontal synchronizing signal raster corresponding to a reference horizontal synchronizing signal which is derived from a system clock, said input digital picture signal being present at a system clock rate not locked with said input digital picture signal, said arrangement comprising:

a correction memory for shifting said input digital picture signal by integral multiples of a period of said system clock;

an interpolator/decimator for shifting an output signal of said correction memory by fractions of said system clock period;

a clock signal generator for generating said system clock at said system clock rate;

a horizontal signal generator coupled to said clock signal generator for generating said reference horizontal synchronizing signal;

a discriminator coupled to said horizontal signal generator and an output of said interpolator/decimator for comparing a horizontal synchronizing signal in an output signal of said interpolator/decimator with the reference horizontal synchronizing signal and for generating a deviation signal as a result of said comparing;

a control member having an input coupled to receive said deviation signal, said control member generating and applying a first correcting variable to the correction memory, said first correcting variable indicating the transformation of the input digital picture signal by integral multiples of the system clock period to be performed by said correction memory, and said control member generating and applying a second correcting variable to the interpolator/decimator, said second correcting variable indicating the transformation of the output from said correction memory by fractions of the system clock period to be performed by said interpolator/decimator.

2. A circuit arrangement as claimed in claim 1, characterized in that the control member comprise a proportional-integral element preceding an integral element for furnishing said first and second correcting variables.

3. A circuit arrangement as claimed in claim 2, characterized in that the control member includes means for generating a control clock signal whose rising or falling edges mark new and valid values of the correcting variables.

4. A circuit arrangement as claimed in claim 9, characterized in that the control member includes means for supplying a correction signal comprising the first and second correcting variables.

5. A circuit arrangement as claimed in claim 4, characterized in that the correction memory has a first and a second memory site coupled to receive the data of the input digital picture signal in parallel, for changing, with each new value of the first correcting variable, a read address of, alternatively, the first or the second memory site in dependence upon the correcting variable in addition to its continuous change at each clock, and in that the correction memory has means for generating a switching signal indicating, after a predeterminable time interval after changing the read address in dependence upon the first correcting variable, that memory site whose read address was last changed in dependence upon the correcting variable.

6. A circuit arrangement as claimed in claim 5, characterized in that the interpolator/decimator comprises two register chains each having a plurality of n consecutively arranged registers, said register chains being coupled to receive the output signal of the first memory site of the correction memory and the output signal of the second memory site, respectively, in that the interpolator/decimator comprises n multipliers, n coefficient memories and n switches, in that one register of each of the two register chains is associated with each switch, for switching, in dependence upon the switching signal, the output data of one of the two associated registers to the multiplier associated with the two registers, said output data being multiplied in said associated multiplier by a filter coefficient from the associated coefficient memory in dependence upon the second correcting variable.

7. A circuit arrangement as claimed in claim 6, characterized in that the predeterminable time interval, after which the switching signal indicates that memory site of the correction memory whose read address was last changed in dependence upon the first correcting variable, is $n+2$ periods of the system clock.

8. A circuit arrangement as claimed in claim 1, characterized in that the control member includes means for generating a control clock signal whose rising or falling edges mark new and valid values of the correcting variables.

9. A circuit arrangement as claimed in claim 1, characterized in that the control member includes means for supplying a correction signal comprising the first and second correcting variables.

10. A circuit arrangement as claimed in claim 1, characterized in that the correction memory has a first and a second memory site coupled to receive the data of the input digital picture signal in parallel, for changing, with each new value of the first correcting variable, a read address of, alternatively, the first or the second memory site in dependence upon the correcting variable in addition to its continuous change at each clock, and in that the correction memory has means for generating a switching signal indicating, after a predeterminable time interval after changing the read address in dependence upon the first correcting variable, that memory site whose read address was last changed in dependence upon the correcting variable.

11. A circuit arrangement as claimed in claim 10, characterized in that the interpolator/decimator comprises two register chains each having a plurality of n consecutively arranged registers, said register chains being coupled to receive the output signal of the first memory site of the correction memory and the output signal of the second memory site, respectively, in that the interpolator/decimator comprises n multipliers, n coefficient memories and n switches, in that one register of each of the two register chains is associated with each switch, for switching, in dependence upon the switching signal, the output data of one of the two associated registers to the multiplier associated with the two registers, said output data being multiplied in said associated multiplier by a filter coefficient from the associated coefficient memory in dependence upon the second correcting variable.

12. A circuit arrangement as claimed in claim 11, characterized in that the predeterminable time interval, after which the switching signal indicates that memory site of the correction memory whose read address was last changed in dependence upon the first correcting variable, is $n+2$ periods of the system clock.

13. A circuit arrangement as claimed in claim 10, characterized in that the predeterminable time interval, after which the switching signal indicates that memory site of the correction memory whose read address was last changed in dependence upon the first correcting variable, is $n+2$ periods of the system clock.

* * * * *